(12) United States Patent
Ikegami et al.

(10) Patent No.: US 6,941,768 B2
(45) Date of Patent: Sep. 13, 2005

(54) EJECTOR CYCLE HAVING COMPRESSOR

(75) Inventors: Makoto Ikegami, Anjo (JP); Hirotsugu Takeuchi, Nagoya (JP)

(73) Assignee: DENSO Corporation, Kariya (JP)

( * ) Notice: Subject to any disclaimer, the term of this patent is extended or adjusted under 35 U.S.C. 154(b) by 171 days.

(21) Appl. No.: 10/627,109

(22) Filed: Jul. 25, 2003

(65) Prior Publication Data
US 2004/0055326 A1 Mar. 25, 2004

(30) Foreign Application Priority Data
Jul. 25, 2002 (JP) ........................................ 2002-216646

(51) Int. Cl.[7] .............................. F25B 1/06; F25B 1/00; F25B 41/06; F25D 21/14
(52) U.S. Cl. ............................. 62/500; 62/498; 62/288; 62/511
(58) Field of Search .......................................... 62/500

(56) References Cited

U.S. PATENT DOCUMENTS

| 6,044,655 A | | 4/2000 | Ozaki et al. | |
|---|---|---|---|---|
| 6,436,993 B1 | * | 8/2002 | Takeuchi et al. | ............... 62/500 |
| 6,698,221 B1 | * | 3/2004 | You | ......................... 62/196.4 |

* cited by examiner

Primary Examiner—Cheryl Tyler
Assistant Examiner—Filip Zec
(74) Attorney, Agent, or Firm—Harness, Dickey & Pierce, PLC

(57) ABSTRACT

When an air conditioning heat load is equal to or greater than a predetermined value, the degree of throttle opening of a nozzle arrangement of an ejector is controlled in such a manner that a coefficient of performance coincides with a target value. When the air conditioning heat load is less than the predetermined value, the degree of throttle opening of the nozzle arrangement is controlled in such a manner that a flow rate of refrigerant, which passes through the nozzle arrangement, coincides with a target value.

10 Claims, 9 Drawing Sheets

EJECTOR CYCLE HAVING COMPRESSOR

CROSS REFERENCE TO RELATED APPLICATION

This application is based on and incorporates herein by reference Japanese Patent Application No. 2002-216646 filed on Jul. 25, 2002.

BACKGROUND OF THE INVENTION

1. Field of the Invention

The present invention relates to an ejector cycle.

2. Description of Related Art

As is known in the art, an ejector cycle is one type of vapor compression refrigeration system, in which refrigerant is depressurized and is expanded through a nozzle arrangement of an ejector. High speed refrigerant discharged from the nozzle arrangement exerts drawing force to draw vapor phase refrigerant, which is evaporated in an evaporator, and expansion energy of the refrigerant is converted into pressure energy to increase the intake pressure of a compressor.

In another type of vapor compression refrigeration system, which isentropically depressurizes the refrigerant through a depressurizing means, such as an expansion valve, the refrigerant discharged from the expansion valve is supplied to the evaporator (hereinafter, this vapor compression refrigeration system will be referred to as an expansion valve cycle). Contrary to this, in the ejector cycle, the refrigerant discharged from the ejector is supplied to a gas-liquid separator, and the liquid phase refrigerant, which is separated by the gas-liquid separator, is supplied to the evaporator, and the vapor phase refrigerant, which is separated by the gas-liquid separator, is supplied to the compressor.

That is, in the expansion valve cycle, the refrigerant is circulated through the compressor, the radiator, the expansion valve and the evaporator in this order and is returned to the compressor to form a single refrigerant flow. On the other hand, in the ejector cycle, refrigerant is circulated through the compressor, the radiator, the ejector and the gas-liquid separator in this order and is returned to the compressor to form one refrigerant flow (hereinafter, referred to as a drive flow), and refrigerant is also circulated through the gas-liquid separator, the evaporator and the ejector in this order and is returned to the gas-liquid separator to form another refrigerant flow (hereinafter, referred to as a drawn flow or driven flow). Furthermore, although the drive flow is directly circulated by the compressor, the driven flow is circulated by pumping action of the ejector (see JIS Z8126 Number 2.1.2.3), which uses energy of the high pressure refrigerant compressed by the compressor.

Thus, when the pumping performance or pumping capacity of the ejector is reduced, the flow rate of the driven flow is reduced to cause stagnation of refrigeration oil, which is mixed in the refrigerant, in the evaporator. The stagnation of refrigeration oil in the evaporator, in turn, causes a reduction in heat absorbing capacity of the evaporator and also causes insufficient lubrication of the compressor due to the shortage of refrigeration oil returned to the compressor.

The refrigeration oil is lubricant, which lubricates sliding components of the compressor. In a typical vapor compression refrigeration system, lubrication of sliding components of the compressor is achieved by mixing refrigeration oil into the refrigerant.

Thus, in the ejector cycle, when a degree of throttle opening of the nozzle arrangement of the ejector is controlled to maximize a coefficient of performance with respect to the refrigerant temperature at the radiator outlet in a manner similar to that of a control operation for controlling a degree of throttle opening of the expansion valve of the expansion valve cycle disclosed in, for example, Japanese Unexamined Patent Publication No. 10-89785, which corresponds to U.S. Pat. No. 6,044,655, the following thing happens. That is, when the heat load becomes relatively small, and thus the amount (flow rate) of circulated refrigerant becomes relatively small, the drive flow becomes relatively small. When the drive flow becomes relatively small, the pump capacity of the ejector becomes relatively small. Thus, in the ejector cycle, when the heat load becomes relatively small, there is a higher possibility of stagnation of refrigeration oil in the evaporator in comparison to the expansion valve cycle.

SUMMARY OF THE INVENTION

The present invention addresses the above disadvantages. Thus, it is an objective of the present invention to provide a novel ejector cycle, which is different from the prior art ejector cycle. It is another objective of the present invention to restrain stagnation of a relatively large amount of refrigeration oil in an evaporator of an ejector cycle.

To achieve the objectives of the present invention, there is provided an ejector cycle of a vapor compression type that transfers heat from a low temperature side to a high temperature side. The ejector cycle includes a compressor, a high pressure side heat exchanger, a low pressure side heat exchanger, an ejector and a gas-liquid separating means. The compressor draws and compresses refrigerant. The high pressure side heat exchanger releases heat from high pressure refrigerant discharged from the compressor. The low pressure side heat exchanger vaporizes low pressure refrigerant. The ejector includes a nozzle arrangement, which depressurizes and expands high pressure refrigerant supplied from the high pressure side heat exchanger. A degree of throttle opening of the nozzle arrangement is variably controllable. The ejector draws vapor phase refrigerant, which is vaporized in the low pressure side heat exchanger, through use of drawing force generated by high speed refrigerant flow discharged from the nozzle arrangement and, at the same time, converts expansion energy of the refrigerant discharged from the nozzle arrangement into pressure energy to increase intake pressure of the compressor. The gas-liquid separating means is for separating the refrigerant discharged from the ejector into vapor phase refrigerant and liquid phase refrigerant. The gas-liquid separating means has a vapor phase refrigerant outlet for outputting the vapor phase refrigerant and a liquid phase refrigerant outlet for outputting the liquid phase refrigerant. The vapor phase refrigerant outlet and the liquid phase refrigerant outlet of the gas-liquid separating means are connected to an inlet of the compressor and an inlet of the low pressure side heat exchanger, respectively. When a heat load is equal to or greater than a predetermined value, the degree of throttle opening of the nozzle arrangement is controlled in such a manner that a coefficient of performance coincides with a target value. When the heat load is less than the predetermined value, the degree of throttle opening of the nozzle arrangement is controlled in such a manner that a flow rate of refrigerant, which passes through the nozzle arrangement, coincides with a target value.

To achieve the objectives of the present invention, there is also provided an ejector cycle of a vapor compression type that transfers heat from a low temperature side to a high temperature side. The ejector cycle includes a compressor, a high pressure side heat exchanger, a low pressure side heat exchanger, an ejector and a gas-liquid separating means. The compressor draws and compresses refrigerant. The high pressure side heat exchanger releases heat from high pressure refrigerant discharged from the compressor. The low pressure side heat exchanger vaporizes low pressure refrigerant. The ejector includes a nozzle arrangement, which depressurizes and expands high pressure refrigerant supplied from the high pressure side heat exchanger. The ejector draws vapor phase refrigerant, which is vaporized in the low pressure side heat exchanger, through use of drawing force generated by high speed refrigerant flow discharged from the nozzle arrangement and, at the same time, converts expansion energy of the refrigerant discharged from the nozzle arrangement into pressure energy to increase intake pressure of the compressor. The gas-liquid separating means is for separating the refrigerant discharged from the ejector into vapor phase refrigerant and liquid phase refrigerant. The gas-liquid separating means has a vapor phase refrigerant outlet for outputting the vapor phase refrigerant and a liquid phase refrigerant outlet for outputting the liquid phase refrigerant. The vapor phase refrigerant outlet and the liquid phase refrigerant outlet of the gas-liquid separating means are connected to an inlet of the compressor and an inlet of the low pressure side heat exchanger, respectively. When a heat load is equal to or greater than a predetermined value, a flow rate of refrigerant discharged from the compressor is controlled in such a manner that a coefficient of performance coincides with a target value. When the heat load is less than the predetermined value, the flow rate of refrigerant discharged from the compressor is controlled in such a manner that a flow rate of refrigerant, which passes through the nozzle arrangement, coincides with a target value.

To achieve the objectives of the present invention, there is also provided an ejector cycle of a vapor compression type that transfers heat from a low temperature side to a high temperature side. The ejector cycle includes a compressor, a high pressure side heat exchanger, a low pressure side heat exchanger, an ejector, a gas-liquid separating means and a flow rate control valve. The compressor draws and compresses refrigerant. The high pressure side heat exchanger releases heat from high pressure refrigerant discharged from the compressor. The low pressure side heat exchanger vaporizes low pressure refrigerant. The ejector includes a nozzle arrangement, which depressurizes and expands high pressure refrigerant supplied from the high pressure side heat exchanger. The ejector draws vapor phase refrigerant, which is vaporized in the low pressure side heat exchanger, through use of drawing force generated by high speed refrigerant flow discharged from the nozzle arrangement and, at the same time, converts expansion energy of the refrigerant discharged from the nozzle arrangement into pressure energy to increase intake pressure of the compressor. The gas-liquid separating means is for separating the refrigerant discharged from the ejector into vapor phase refrigerant and liquid phase refrigerant. The gas-liquid separating means has a vapor phase refrigerant outlet for outputting the vapor phase refrigerant and a liquid phase refrigerant outlet for outputting the liquid phase refrigerant. The vapor phase refrigerant outlet and the liquid phase refrigerant outlet of the gas-liquid separating means are connected to an inlet of the compressor and an inlet of the low pressure side heat exchanger, respectively. The flow rate control valve controls a flow rate of refrigerant supplied from the gas-liquid separating means to the low pressure side heat exchanger. When a heat load is equal to or greater than a predetermined value, a degree of opening of the flow rate control valve is controlled in such a manner that a coefficient of performance coincides with a target value. When the heat load is less than the predetermined value, the degree of opening of the flow rate control valve is controlled in such a manner that a flow rate of refrigerant, which passes through the nozzle arrangement, coincides with a target value.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

Figure 1:
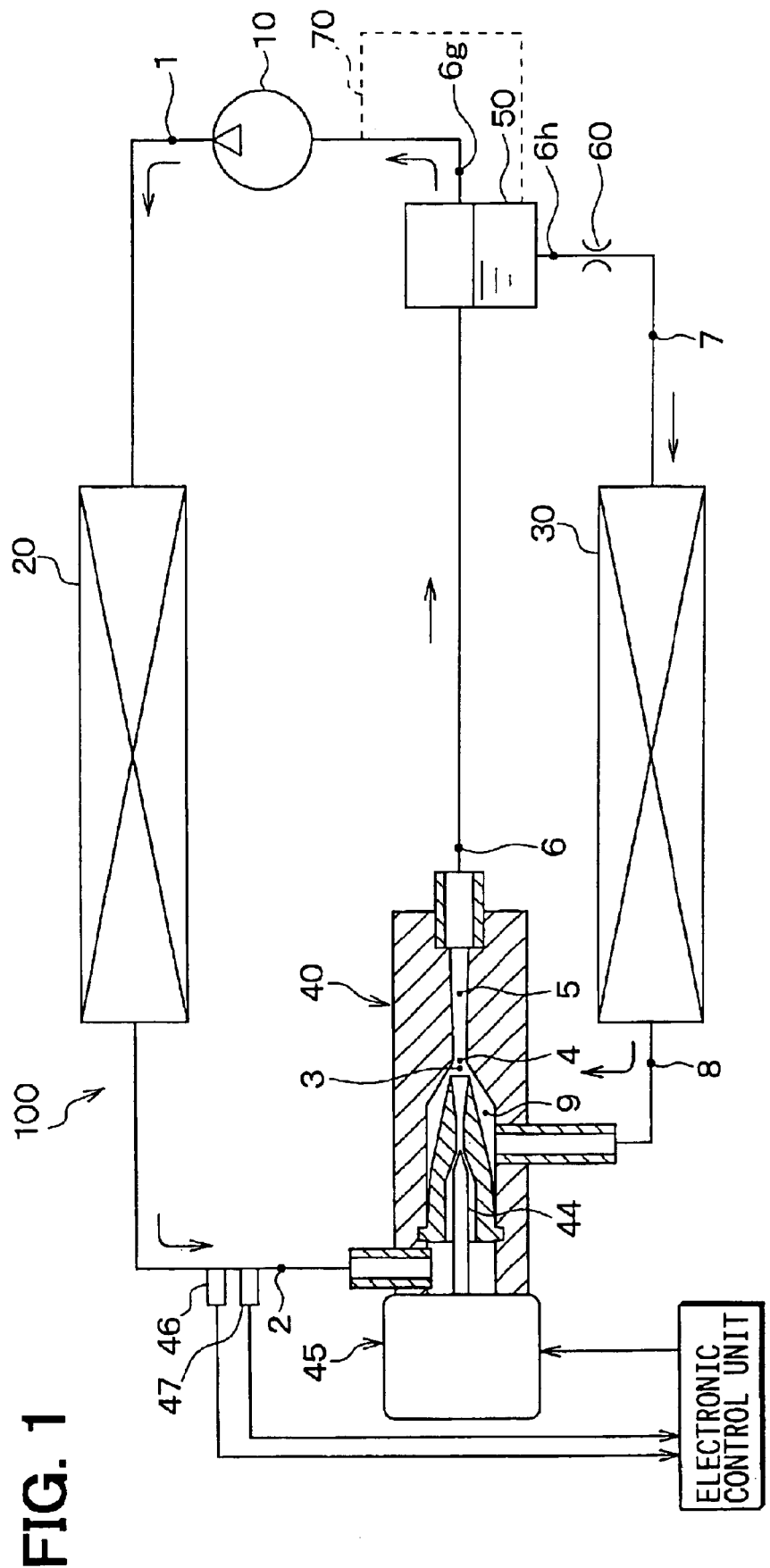
FIG. 1 is a schematic view of an ejector cycle according to a first embodiment.

An ejector cycle according to a first embodiment of the present invention is embodied in a vehicle air conditioning system. FIG. 1 schematically shows the ejector cycle 100.

With reference to FIG. 1, a compressor 10 is a variable displacement compressor, which is powered by a drive engine of a vehicle to draw and compress refrigerant. A radiator 20 is a high pressure side heat exchanger, which exchange heat between the hot pressurized refrigerant discharged from the compressor 10 and outside air located outside a passenger compartment of the vehicle to cool the refrigerant.

The variable displacement compressor is a compressor that can vary a theoretical amount of refrigerant discharged from the compressor per rotation of a shaft.

An evaporator 30 is a low pressure side heat exchanger, which exchanges heat between the low pressure refrigerant and the air to be discharged into the passenger compartment, so that the liquid phase refrigerant is vaporized or evaporated to cool the air to be discharged into the passenger compartment. An ejector 40 depressurizes and expands the refrigerant supplied from the radiator 20 to draw the vapor phase refrigerant, which has been vaporized in the evaporator 30. Also, the ejector 40 converts expansion energy of the refrigerant into pressure energy of the refrigerant to increase the intake pressure of the compressor 10. Details of the ejector 40 will be described later.

The refrigerant discharged from the ejector 40 is supplied to a gas-liquid separator 50. The gas-liquid separator 50 serves as a gas-liquid separating means for separating and storing the refrigerant in two phases, i.e., the vapor phase refrigerant and the liquid phase refrigerant. A vapor phase refrigerant outlet of the gas-liquid separator 50 is connected to an inlet of the compressor 10, and a liquid phase refrigerant outlet of the gas-liquid separator 50 is connected to an inlet of the evaporator 30.

A restrictor 60 is a depressurizing means for depressurizing the liquid phase refrigerant discharged from the gas-liquid separator 50. An oil return passage 70 conducts the refrigeration oil, which is separated by the gas-liquid separator 50, to the inlet of the compressor 10.

Next, the ejector 40 will be descried in greater details.

Figure 2:
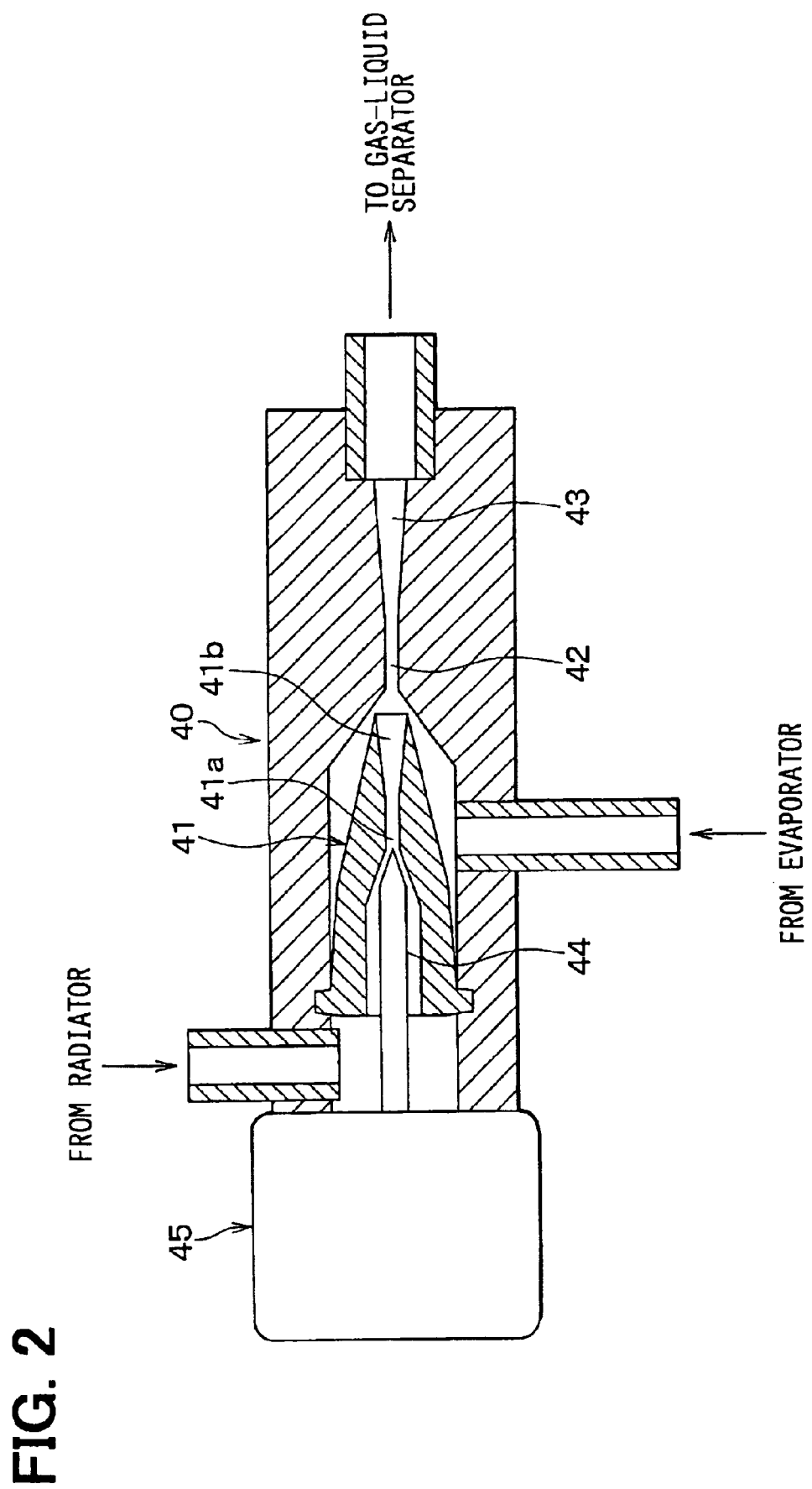
FIG. 2 is a schematic cross sectional view of an ejector of the ejector cycle according to the first embodiment.

With reference to FIG. 2, the ejector 40 includes a nozzle arrangement 41, a mixer arrangement 42 and a diffuser arrangement 43. The nozzle arrangement 41 converts the pressure energy of the high pressure refrigerant supplied from the radiator 20 to the velocity energy in such a manner that the refrigerant is isentropically depressurized and is expanded by the nozzle arrangement 41. In the mixer arrangement 42, high speed refrigerant flow discharged from the nozzle arrangement 41 draws the vapor phase refrigerant, which has been vaporized in the evaporator 30, and is mixed with the vapor phase refrigerant. In the diffuser arrangement 43, the refrigerant discharged from the nozzle arrangement 41 and the refrigerant drawn from the evaporator 30 are further mixed in such a manner that the velocity energy of the refrigerant is converted into the pressure energy to increase the pressure of the mixed refrigerant discharged from the diffuser arrangement 43.

In the mixer arrangement 42, the refrigerants are mixed in such a manner that the sum of the kinetic momentum of the refrigerant discharged from the nozzle arrangement 41 and the kinetic momentum of the refrigerant drawn into the ejector 40 from the evaporator 30 is conserved. Thus, even in the mixer arrangement 42, the static pressure of the refrigerant is increased. In the diffuser arrangement 43, a passage cross sectional size is linearly increased toward the downstream end of the diffuser arrangement 43 to convert the dynamic pressure of the refrigerant to the corresponding static pressure. Thus, in the ejector 40, the refrigerant pressure is increased through both the mixer arrangement 42 and the diffuser arrangement 43. Therefore, the mixer arrangement 42 and the diffuser arrangement 43 are collectively referred to as a pressurizer arrangement.

In the ideal ejector 40, desirably, the mixer arrangement 42 increases the refrigerant pressure in such a manner that the sum of the kinetic momentums of the two refrigerant flows is conserved, and the diffuser arrangement 43 increases the refrigerant pressure in such a manner that the energy of the mixed refrigerant is conserved.

The nozzle arrangement 41 is a Laval nozzle and includes a throttled portion 41a and a diverging portion 41b. The throttled portion 41a has a minimum passage cross sectional area in the nozzle arrangement 41. The diverging portion 41b extends from the throttled portion 41a and has an increasing inner diameter, which increases in a direction away from the throttled portion 41a. Adjustment of a degree of throttle opening of the nozzle arrangement 41 is performed by moving a needle valve body 44 by an actuator 45 in the nozzle arrangement 41 in an axial direction of the nozzle arrangement 41. In the present embodiment, an electric actuator, such as a stepping motor having a screw mechanism or a linear solenoid, is used as the actuator 45.

In the present embodiment, "adjustment of the degree of the throttle opening of the nozzle arrangement 41" means variable control of at least the degree of opening of the throttled portion 41a among the degree of opening of the throttled portion 41a and the degree of opening at the outlet of the nozzle arrangement 41 (diverging portion 41b).

The high pressure side refrigerant temperature (refrigerant temperature at the inlet of the nozzle arrangement 41) Th, which serves as a parameter of an air conditioning heat load, is measured through a temperature sensor 46. When the air conditioning heat load, i.e., the high pressure side refrigerant temperature Th is equal to or greater than a predetermined temperature, the degree of throttle opening of the nozzle arrangement 41 is controlled in such a manner that the high pressure side refrigerant pressure (refrigerant pressure at the inlet of the nozzle arrangement 41) Ph, which is measured through a pressure sensor 47, coincides with a target pressure Tp, which is determined based on the measured refrigerant temperature measured through the temperature sensor 46.

In this embodiment, the target pressure Tp is a high pressure side refrigerant pressure, which achieves the highest coefficient of performance of the ejector cycle with respect to the high pressure side refrigerant temperature Th. In the present embodiment, carbon dioxide is used as the refrigerant. When the air conditioning heat load is relatively large, the degree of throttle opening of the nozzle arrangement 41 is controlled in such a manner that the pressure of the high pressure refrigerant supplied to the nozzle arrangement 41 is increased to a level equal to or greater than a critical pressure of the refrigerant, as shown in FIG. 3.

On the other hand, when the air conditioning heat load, i.e., the high pressure side refrigerant temperature Th is less than the predetermined temperature, the degree of throttle opening of the nozzle arrangement 41 is controlled in such a manner that the flow rate of the refrigerant, i.e., the drive flow, which passes through the nozzle arrangement 41, coincides with a target value. More specifically, when the high pressure side refrigerant temperature Th is less than the predetermined temperature, the degree of throttle opening of the nozzle arrangement 41 is greater than the predetermined degree of throttle opening of the nozzle arrangement 41 that causes the achievement of the target pressure Tp determined based on the high pressure side refrigerant temperature Th, so that a required pump capacity, which is required to circulate the refrigeration oil stagnated in the evaporator 30 to the compressor 10, is achieved by the ejector 40.

Figure 3:
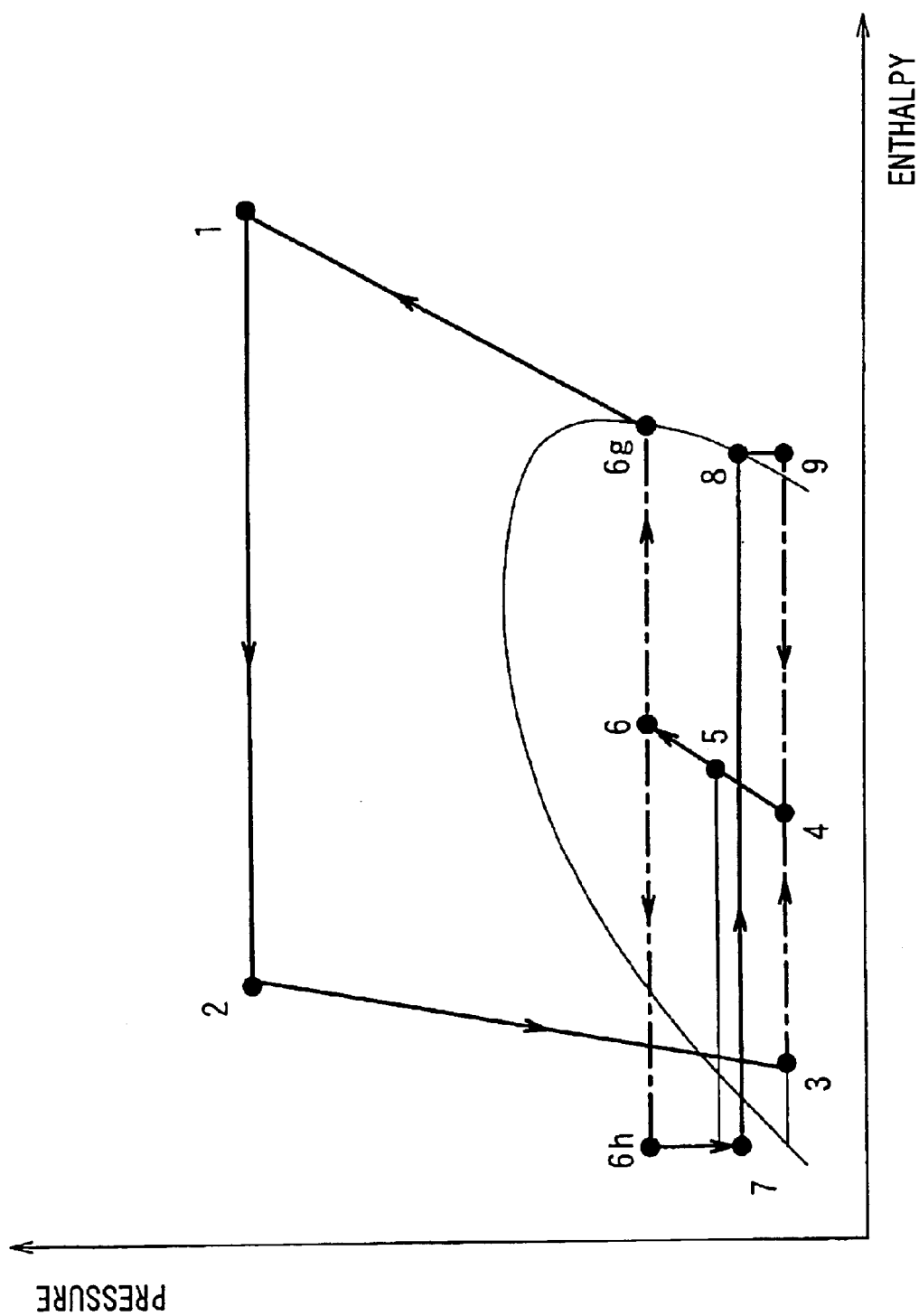
FIG. 3 is a pressure-enthalpy (p-h) diagram.

In FIG. 3, points indicated by numerals 1–9 correspond to points indicated by numerals 1–9 in FIG. 1 and show corresponding states of the refrigerant at these points 1–9.

Operation of the ejector cycle is schematically described with reference to FIG. 3.

The refrigerant discharged from the compressor 10 is circulated to the radiator 20. The refrigerant, which is cooled by the radiator 20, is isentropically depressurized and is expanded by the nozzle arrangement 41 of the ejector 40, so that the flow of refrigerant is accelerated to a level equal to or greater than the sonic velocity and is supplied to the mixer arrangement 42.

Due to the pumping action induced by the drawing action of the high speed refrigerant supplied to the mixer arrangement 42, the vapor phase refrigerant, which has been vaporized in the evaporator 30, is drawn into the mixer arrangement 42. Thus, the low pressure refrigerant is circulated through the gas-liquid separator 50, the restrictor 60, the evaporator 30 and the ejector 40 (pressurizer arrangement) in this order and is then returned to the gas-liquid separator 50.

On the other hand, the refrigerant (drawn flow or driven flow), which is drawn from the evaporator 30, and the refrigerant (drive flow), which is discharged from the nozzle arrangement 41, are mixed in the mixer arrangement 42 and are supplied to the diffuser arrangement 43 where the dynamic pressure of the mixed refrigerant is converted into the static pressure. Thereafter, the mixed refrigerant is returned to the gas-liquid separator 50.

Advantages of the present embodiment will be described.

In the present embodiment, when the air conditioning heat load is equal to or greater than the predetermined value, the degree of opening of the nozzle arrangement 41 is controlled in such a manner that the coefficient of performance coincides with the target value. Furthermore, when the air conditioning heat load is less than the predetermined value, the degree of opening of the nozzle arrangement 41 is controlled in such a manner that the flow rate of refrigerant, which passes through the nozzle arrangement 41, coincides with the target value. Thus, at the time of relatively low air conditioning heat load, which causes stagnation of refrigeration oil in the evaporator 30, the required pump capacity, which is required to circulate the refrigeration oil stagnated in the evaporator 30 to the compressor 10, can be achieved by the ejector 40.

Thus, it is possible to prevent stagnation of relatively large amount of refrigeration oil in the evaporator 30, and therefore it is possible to prevent a reduction in the refrigeration capacity of the evaporator 30 and also shortage of lubricant in the compressor 10.

Figure 4:
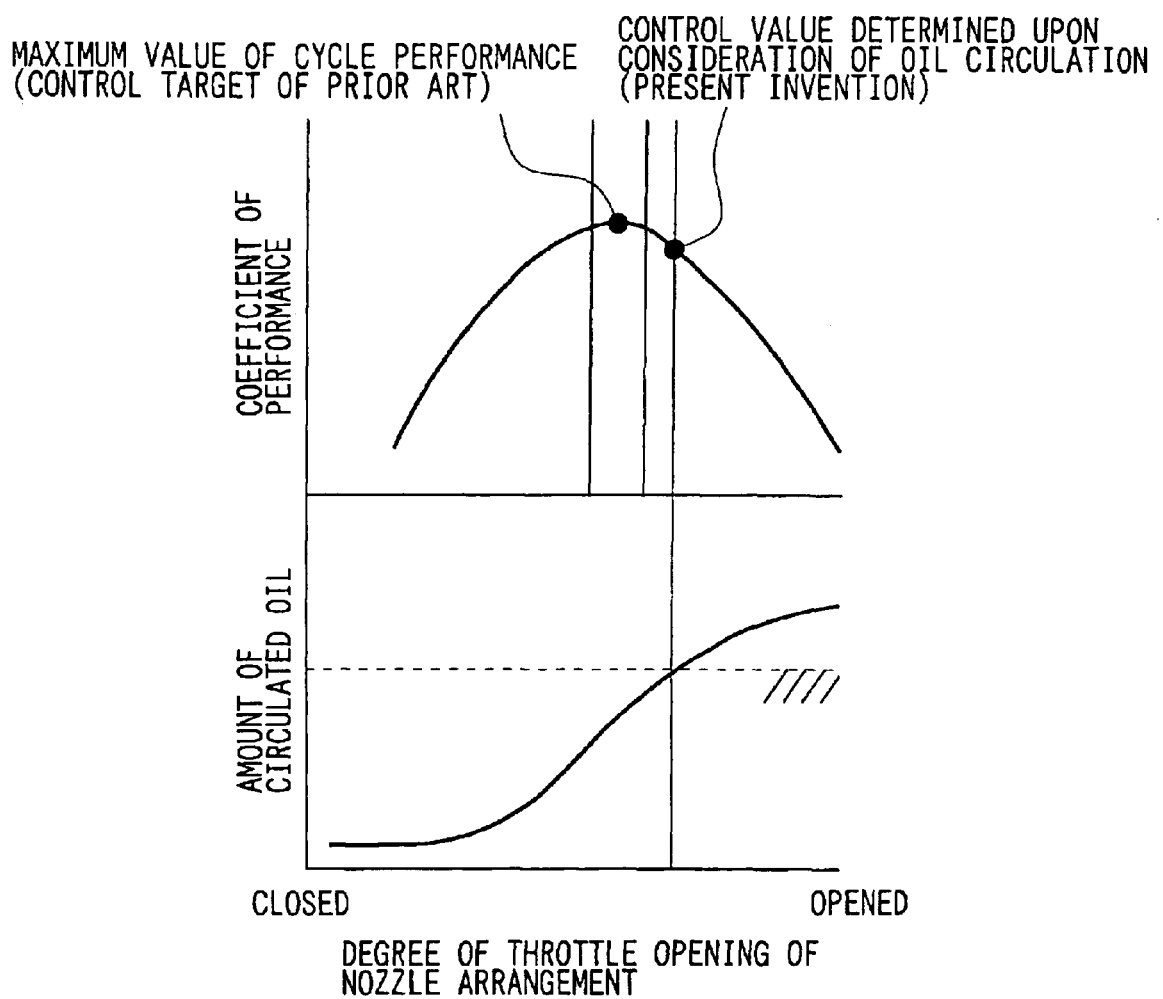
FIG. 4 is a graph showing a coefficient of performance and an amount of circulated oil with respect to a degree of throttle opening of a nozzle arrangement of the ejector cycle according to the first embodiment.
Figure 5:
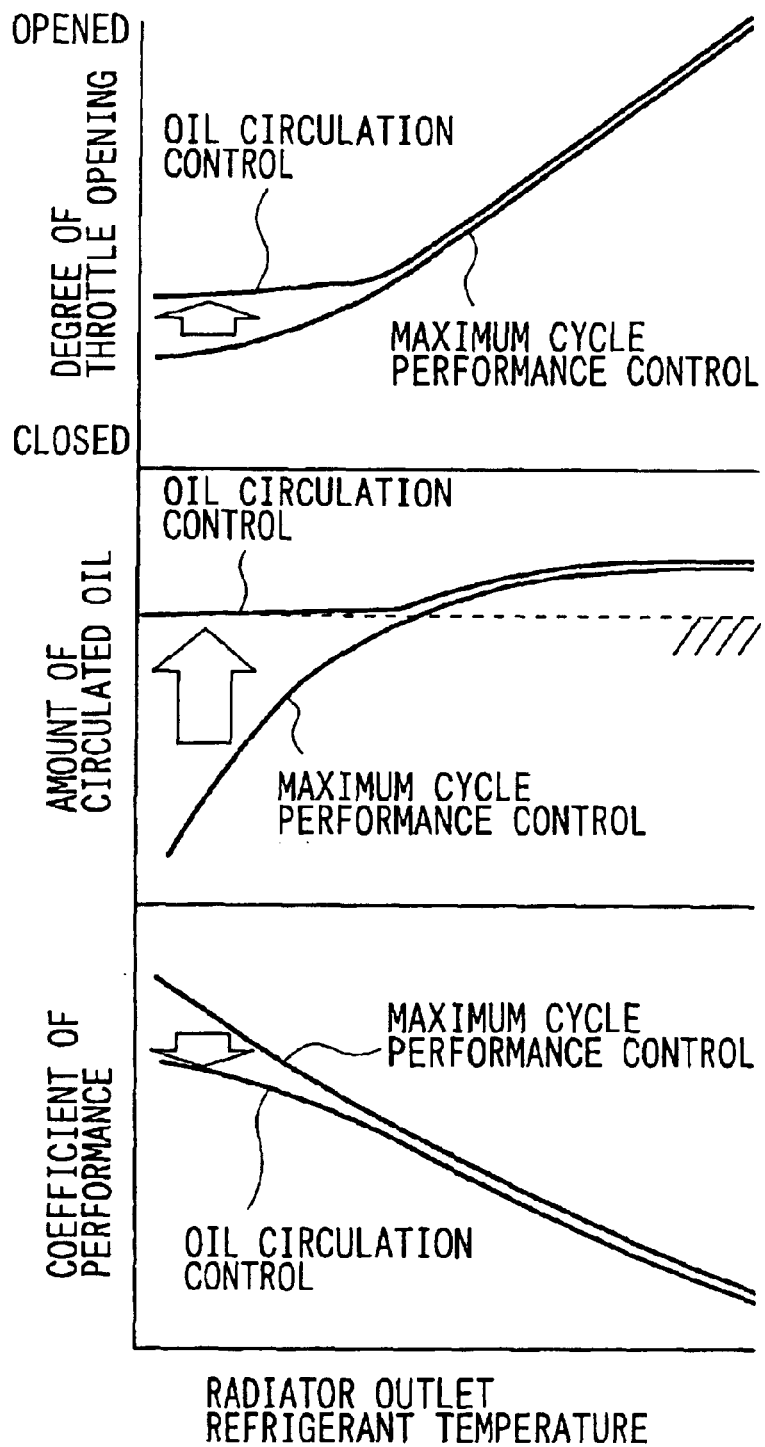
FIG. 5 is a graph showing a degree of throttle opening of the nozzle arrangement, an amount of circulated oil and a coefficient of performance with respect to the radiator outlet side refrigerant temperature in the ejector cycle according to the first embodiment.

FIG. 4 shows the coefficient of performance and the amount (flow rate) of circulated oil with respect to the degree of throttle opening of the nozzle arrangement 41 in the ejector cycle according to the present embodiment. FIG. 5 shows the degree of throttle opening of the nozzle arrangement 41, the amount (flow rate) of circulated oil and the coefficient of performance with respect to the radiator outlet side refrigerant temperature, i.e., the air conditioning heat load.

(Second Embodiment)

Figure 6:
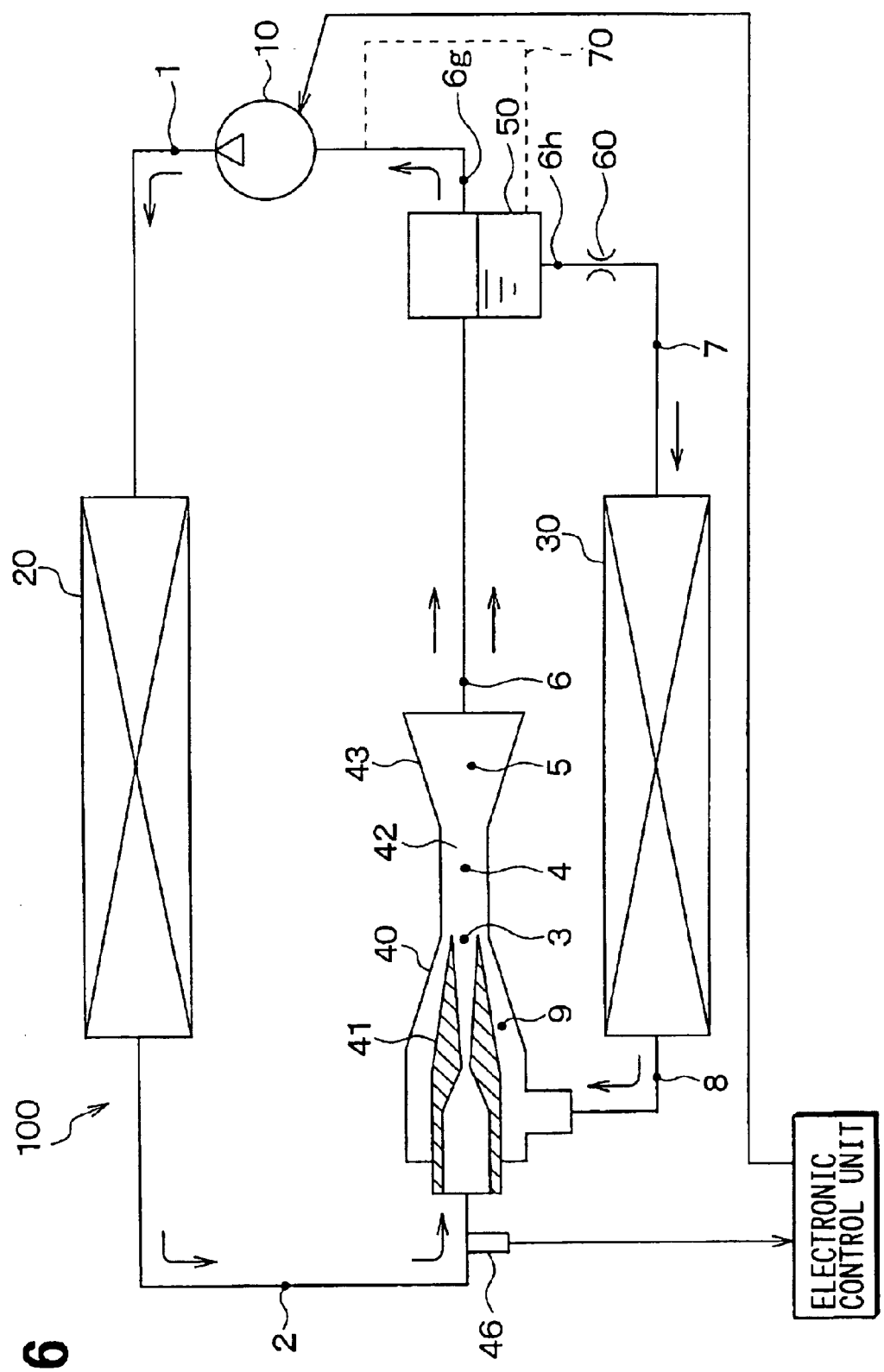
FIG. 6 is a schematic view of an ejector cycle according to a second embodiment.

FIG. 6 schematically shows an ejector cycle according to a second embodiment of the present invention. In the present embodiment, when the air conditioning heat load, i.e., the high pressure side refrigerant temperature is equal to or greater than the predetermined value, the flow rate of refrigerant discharged from the compressor 10 is controlled in such a manner that the coefficient of performance coincides with the target value, that is, the coefficient of performance of the ejector cycle is maximized with respect to the high pressure side refrigerant temperature Th. When the air conditioning heat load is less than the predetermined value, the flow rate of refrigerant discharged from the compressor 10 is controlled in such a manner that the flow rate of refrigerant, which passes through the nozzle arrangement 41, coincides with the target value.

In the present embodiment, the flow rate of refrigerant discharged from the compressor 10 is controlled by controlling the discharge volume of the compressor 10. However, in a case where the compressor 10 is driven by a dedicated drive source, such as an electric motor, which is dedicated to the compressor 10, the flow rate of refrigerant discharged from the compressor 10 can be controlled by controlling a rotational speed of the compressor 10.

With the above arrangement, similar to the first embodiment, at the time of relatively low air conditioning heat load, which causes stagnation of refrigeration oil in the evaporator 30, the required pump capacity, which is required to circulate the refrigeration oil stagnated in the evaporator 30 to the compressor 10, can be achieved by the ejector 40.

Figure 7:
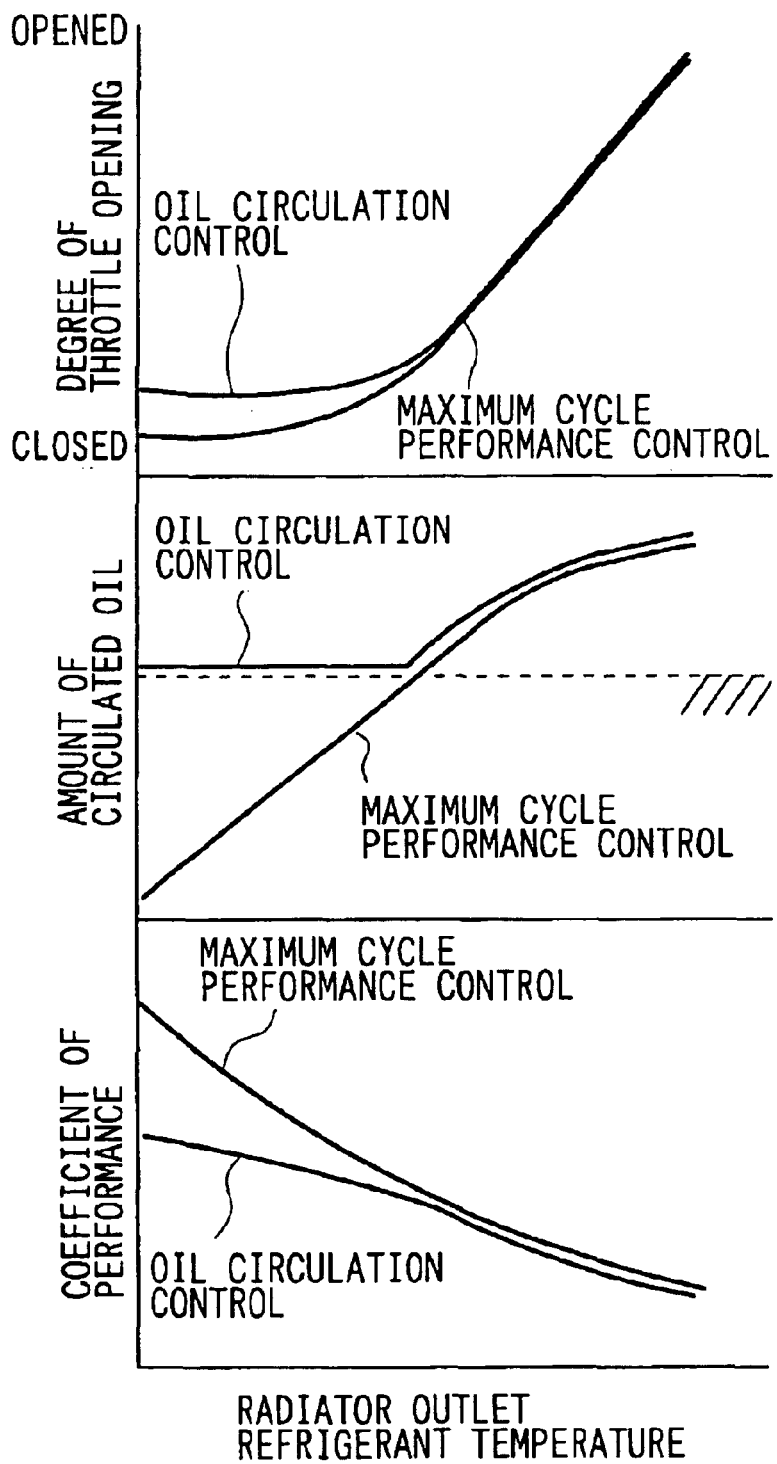
FIG. 7 is a graph showing a degree of throttle opening of the nozzle arrangement, an amount of circulated oil and a coefficient of performance with respect to the radiator outlet side refrigerant temperature in the ejector cycle according to the second embodiment.

FIG. 7 shows the degree of throttle opening of the nozzle arrangement 41, the amount (flow rate) of circulated oil and the coefficient of performance with respect to the radiator outlet side refrigerant temperature, i.e., the air conditioning load.

In FIG. 6, the ejector 40 of a fixed type, in which the degree of throttle opening of the nozzle arrangement 41 is fixed, is used. However, the ejector 40 can be replaced with an ejector of a variable type, which is similar to the ejector 40 of the first embodiment to combine the first embodiment and the second embodiment.

(Third Embodiment)

Figure 8:
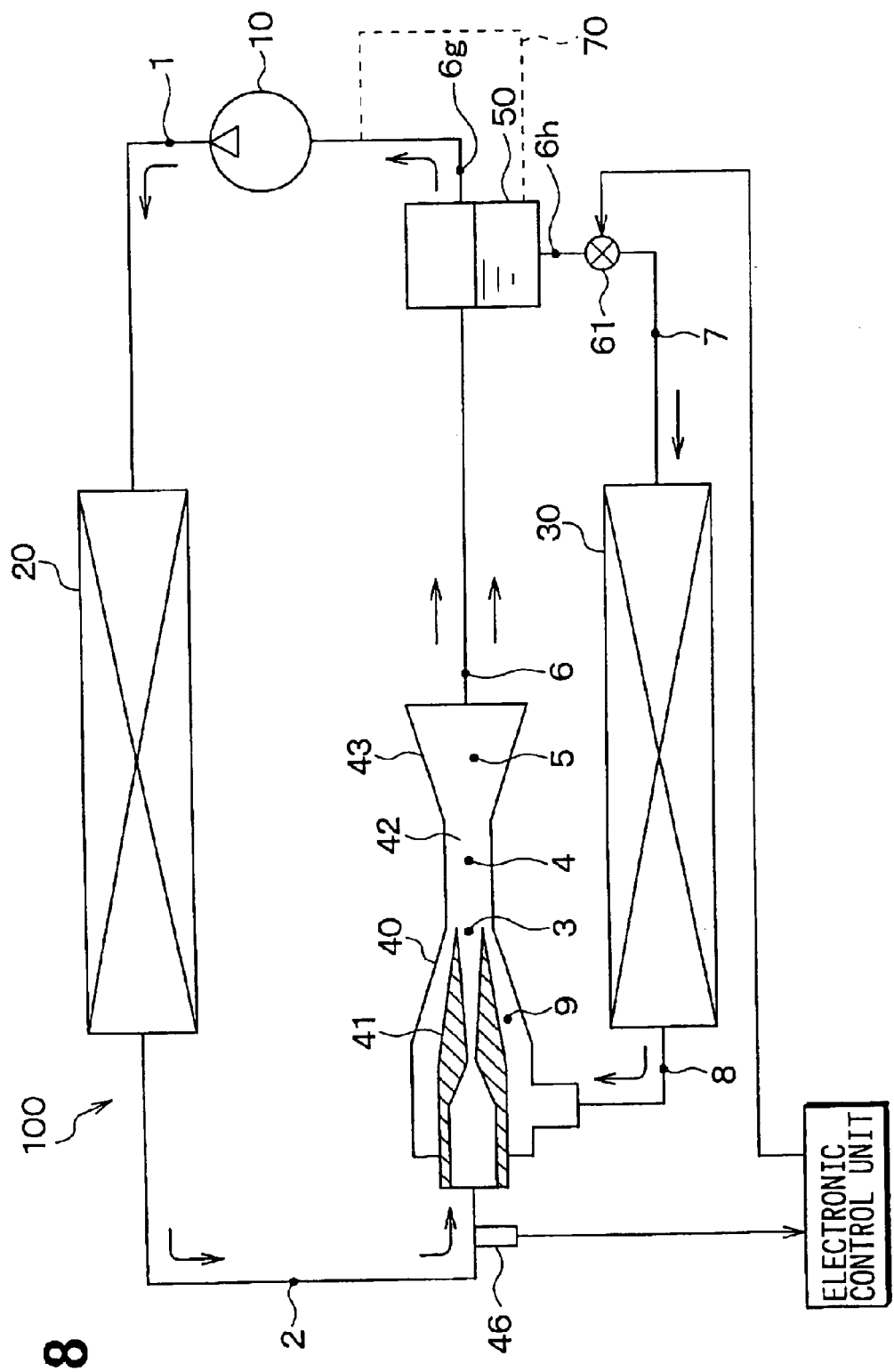
FIG. 8 is a schematic view of an ejector cycle according to a third embodiment.

In a third embodiment of the present invention, as shown in FIG. 8, the restrictor 60 is replaced with a flow rate control valve 61. Furthermore, when the air conditioning heat load, i.e., the high pressure side refrigerant temperature is equal to or greater than the predetermined value, the degree of opening of the flow rate control valve 61 is controlled in such a manner that the coefficient of performance of the ejector cycle coincides with the target value, that is, the coefficient of performance of the ejector cycle is maximized with respect to the high pressure side refrigerant temperature Th. When the air conditioning heat load is less than the predetermined value, the degree of opening of the flow rate control valve 61 is controlled in such a manner that the flow rate of refrigerant, which passes through the nozzle arrangement 41, coincides with the target value.

With the above arrangement, similar to the first embodiment, at the time of relatively low air conditioning heat load, which causes stagnation of refrigeration oil in the evaporator 30, the required pump capacity, which is required to circulate the refrigeration oil stagnated in the evaporator 30 to the compressor 10, can be achieved by the ejector 40.

Figure 9:
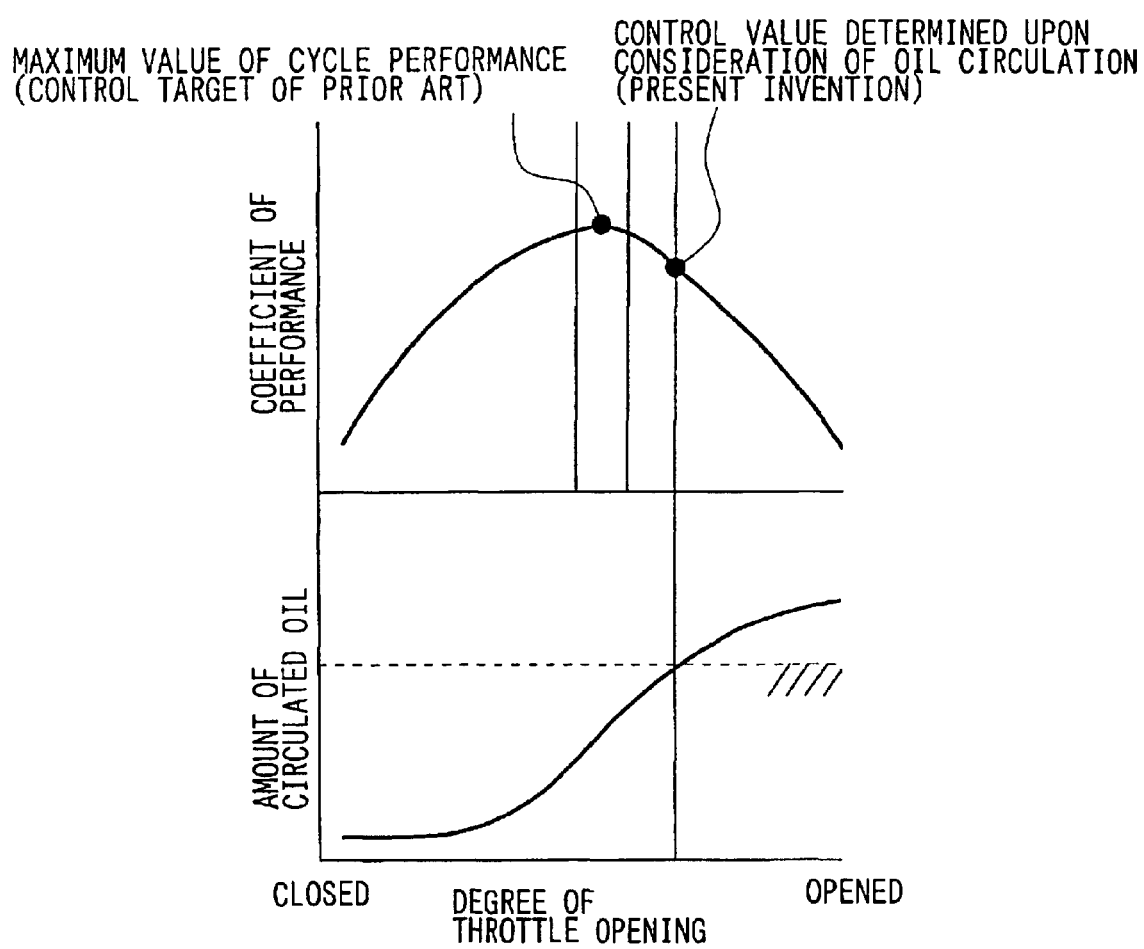
FIG. 9 is a graph showing a coefficient of performance and an amount of circulated oil with respect to a degree of throttle opening according to the third embodiment.

FIG. 9 shows the coefficient of performance and the amount (flow rate) of circulated oil with respect to the degree of throttle opening of the nozzle arrangement 41 in the ejector cycle of the present embodiment.

In FIG. 8, the ejector 40 of a fixed type, in which the degree of throttle opening of the nozzle arrangement 41 is fixed, is used. However, the ejector 40 can be replaced with an ejector of a variable type, which is similar to the ejector 40 of the first embodiment to combine the first embodiment and the third embodiment.

(Other Embodiments)

In the above embodiments, the Laval nozzle is used as the nozzle arrangement 41. However, the present invention is not limited to this. For example, a tapered nozzle, which is tapered toward a distal end, can be uses in place of the Laval nozzle.

The present invention is not limited to the above embodiments, and at least two of the above embodiments can be combined.

Furthermore, a valve, which controls the degree of throttle opening in such a manner that the heat of refrigerant at the refrigerant outlet of the evaporator 30 coincides with the target value, can be provided in the inlet of the nozzle arrangement 41.

Also, an internal heat exchanger, which exchanges heat between the high pressure refrigerant discharged from the radiator 20 and the low pressure refrigerant supplied to the compressor 10, can be provided.

Additional advantages and modifications will readily occur to those skilled in the art. The invention in its broader terms is therefore not limited to the specific details described above.

What is claimed is:

1. An ejector cycle of a vapor compression type that transfers heat from a low temperature side to a high temperature side, the ejector cycle comprising:
   a compressor that draws and compresses refrigerant;
   a high pressure side heat exchanger that releases heat from high pressure refrigerant discharged from the compressor;
   a low pressure side heat exchanger that vaporizes low pressure refrigerant;
   an ejector that includes a nozzle arrangement, which depressurizes and expands high pressure refrigerant supplied from the high pressure side heat exchanger, wherein:
   a degree of throttle opening of the nozzle arrangement is variably controllable; and
   the ejector draws vapor phase refrigerant, which is vaporized in the low pressure side heat exchanger, through use of drawing force generated by high speed refrigerant flow discharged from the nozzle arrangement and, at the same time, converts expansion energy of the refrigerant discharged from the nozzle arrangement into pressure energy to increase intake pressure of the compressor; and
   a gas-liquid separating means for separating the refrigerant discharged from the ejector into vapor phase refrigerant and liquid phase refrigerant, wherein the gas-liquid separating means has a vapor phase refrigerant outlet for outputting the vapor phase refrigerant and a liquid phase refrigerant outlet for outputting the liquid phase refrigerant, and the vapor phase refrigerant outlet and the liquid phase refrigerant outlet of the gas-liquid separating means are connected to an inlet of the compressor and an inlet of the low pressure side heat exchanger, respectively, wherein:
   when a heat load is equal to or greater than a predetermined value, the degree of throttle opening of the nozzle arrangement is controlled in such a manner that a coefficient of performance coincides with a first target value; and
   when the heat load is less than the predetermined value, the degree of throttle opening of the nozzle arrangement is controlled in such a manner that a flow rate of refrigerant, which passes through the nozzle arrangement, coincides with a second target value.

2. The ejector cycle according to claim 1, wherein when the heat load is less than the predetermined value, the degree of throttle opening of the nozzle arrangement is controlled in such a manner that the flow rate of refrigerant, which passes through the nozzle arrangement, coincides with the second target value to achieve a specific pump capacity which circulates a required amount of refrigerant to the compressor.

3. The ejector cycle according to claim 1, further comprising a needle valve body, which is received in the nozzle arrangement and is movable relative to the nozzle arrangement, wherein the degree of throttle opening of the nozzle arrangement is controlled by the needle valve body.

4. The ejector cycle according to claim 3, wherein the needle valve body is movable in an axial direction of the nozzle arrangement and is tapered toward an outlet of the nozzle arrangement.

5. An ejector cycle of a vapor compression type that transfers heat from a low temperature side to a high temperature side, the ejector cycle comprising:
   a compressor that draws and compresses refrigerant;
   a high pressure side heat exchanger that releases heat from high pressure refrigerant discharged from the compressor;
   a low pressure side heat exchanger that vaporizes low pressure refrigerant;
   an ejector that includes a nozzle arrangement, which depressurizes and expands high pressure refrigerant supplied from the high pressure side heat exchanger, wherein the ejector draws vapor phase refrigerant, which is vaporized in the low pressure side heat exchanger, through use of drawing force generated by high speed refrigerant flow discharged from the nozzle arrangement and, at the same time, converts expansion energy of the refrigerant discharged from the nozzle arrangement into pressure energy to increase intake pressure of the compressor; and
   a gas-liquid separating means for separating the refrigerant discharged from the ejector into vapor phase refrigerant and liquid phase refrigerant, wherein the gas-liquid separating means has a vapor phase refrigerant outlet for outputting the vapor phase refrigerant and a liquid phase refrigerant outlet for outputting the liquid phase refrigerant, and the vapor phase refrigerant outlet and the liquid phase refrigerant outlet of the gas-liquid separating means are connected to an inlet of the compressor and an inlet of the low pressure side heat exchanger, respectively, wherein:
   when a heat load is equal to or greater than a predetermined value, a flow rate of refrigerant discharged from the compressor is controlled in such a manner that a coefficient of performance coincides with a first target value; and
   when the heat load is less than the predetermined value, the flow rate of refrigerant discharged from the compressor is controlled in such a manner that a flow rate of refrigerant, which passes through the nozzle arrangement, coincides with a second target value.

6. The ejector cycle according to claim 5, wherein when the heat load is less than the predetermined value, the flow rate of refrigerant discharged from the compressor is controlled in such a manner that the flow rate of refrigerant, which passes through the nozzle arrangement, coincides with the second target value to achieve a specific pump capacity which circulates a required amount of refrigerant to the compressor.

7. The ejector cycle according to claim 5, wherein the flow rate of refrigerant discharged from the compressor is controlled by controlling a rotational speed of the compressor.

8. An ejector cycle of a vapor compression type that transfers heat from a low temperature side to a high temperature side, the ejector cycle comprising:
   a compressor that draws and compresses refrigerant;
   a high pressure side heat exchanger that releases heat from high pressure refrigerant discharged from the compressor;
   a low pressure side heat exchanger that vaporizes low pressure refrigerant;
   an ejector that includes a nozzle arrangement, which depressurizes and expands high pressure refrigerant supplied from the high pressure side heat exchanger, wherein the ejector draws vapor phase refrigerant, which is vaporized in the low pressure side heat exchanger, through use of drawing force generated by high speed refrigerant flow discharged from the nozzle arrangement and, at the same time, converts expansion energy of the refrigerant discharged from the nozzle arrangement into pressure energy to increase intake pressure of the compressor;

a gas-liquid separating means for separating the refrigerant discharged from the ejector into vapor phase refrigerant and liquid phase refrigerant, wherein the gas-liquid separating means has a vapor phase refrigerant outlet for outputting the vapor phase refrigerant and a liquid phase refrigerant outlet for outputting the liquid phase refrigerant, and the vapor phase refrigerant outlet and the liquid phase refrigerant outlet of the gas-liquid separating means are connected to an inlet of the compressor and an inlet of the low pressure side heat exchanger, respectively; and a flow rate control valve that controls a flow rate of refrigerant supplied from the gas-liquid separating means to the low pressure side heat exchanger, wherein:

when a heat load is equal to or greater than a predetermined value, a degree of opening of the flow rate control valve is controlled in such a manner that a coefficient of performance coincides with a first target value; and when the heat load is less than the predetermined value, the degree of opening of the flow rate control valve is controlled in such a manner that a flow rate of refrigerant, which passes through the nozzle arrangement, coincides with a second target value.

9. The ejector cycle according to claim 8, wherein when the heat load is less than the predetermined value, the degree of opening of the flow rate control valve is controlled in such a manner that the flow rate of refrigerant, which passes through the nozzle arrangement, coincides with the second target value to achieve a specific pump capacity, which circulates a required amount of refrigerant to the compressor.

10. The ejector cycle according to claim 8, wherein the flow rate control valve is positioned between the gas-liquid separating means and the low pressure side heat exchanger.

* * * * *